UNITED STATES PATENT OFFICE 2,355,016

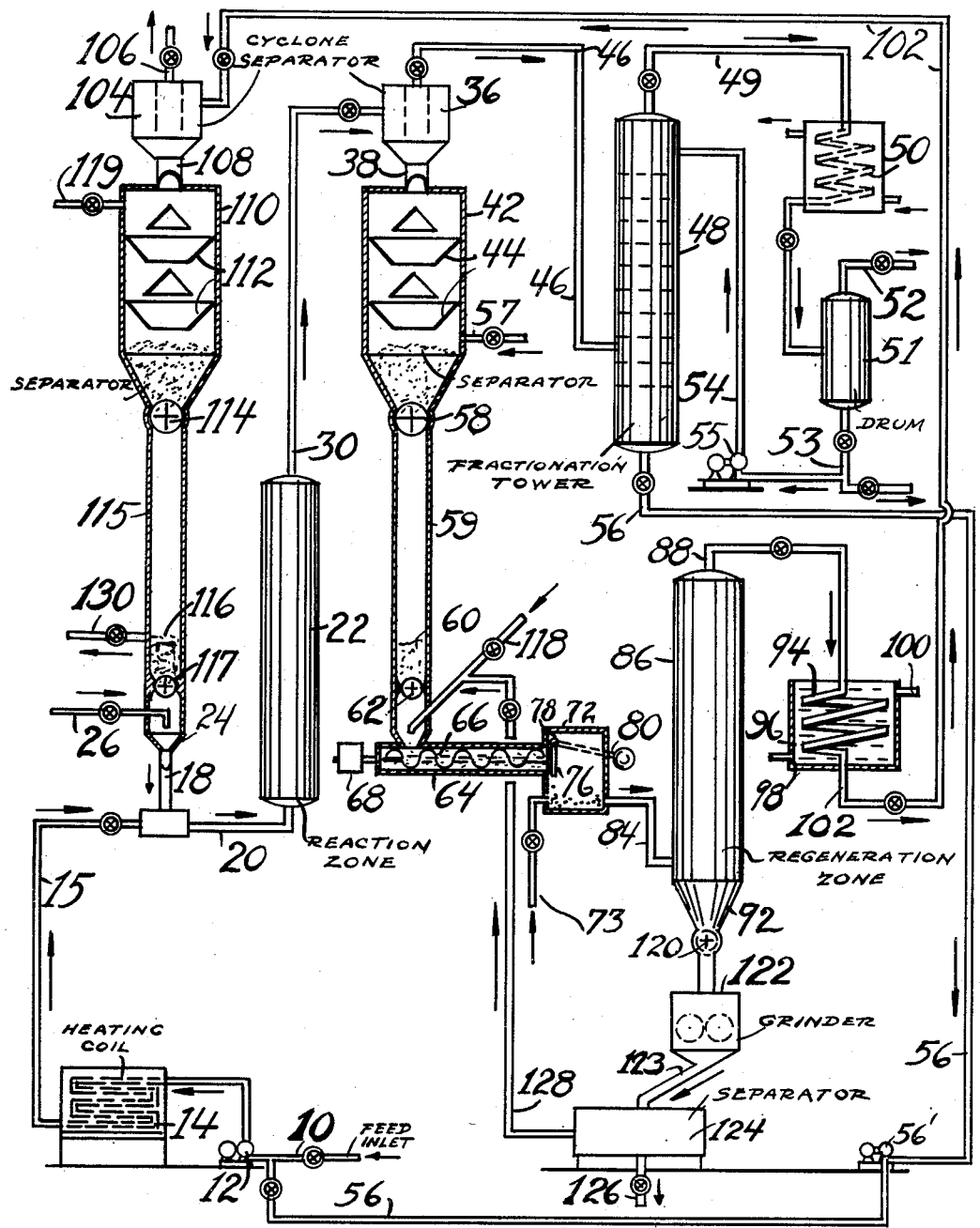

TREATING HYDROCARBON FLUIDS

Gustav A. Stein, Jr., Baton Rouge, La., assignor to Standard Oil Development Company, a corporation of Delaware Application July 18, 1940, Serial No. 346,138

1 Claim. (Cl. 196—52)

This invention relates to the conversion or cracking of hydrocarbons in the presence of a catalyst and more particularly relates to the cracking of hydrocarbons in the presence of a powdered catalyst.

In using powdered catalyst in the conversion of hydrocarbons, it has been found that in processes where the powdered catalyst such as natural or treated clay is regenerated after it has been separated from the reaction products and reused that some of the catalyst particles agglomerate or ball up to form larger catalyst particles. The larger particles show poor cracking activity. These larger particles also raise the density of the fluid passing through the system and increase the pressure drop. In some instances the agglomerate particles accumulate to such an extent so that the pressure drop becomes so great that the flow of material through the system stops. This increase in size of the catalyst particles during use is especially noticeable in processes where the catalytic conversion of the hydrocarbons takes place at substantially atmospheric pressure whereas the regeneration is effected at superatmospheric pressure. My invention is useful for removing balls or agglomerates of catalyst which are formed during the cracking and regeneration operation and which are considerably larger than the catalyst particles used at the beginning of the operation.

According to my invention the large catalyst particles or agglomerates are removed from the system at any desired point or points. For example, the agglomerates or balls may be removed from the regenerated catalyst at the bottom of the regeneration zone by classification or from the catalyst particles leaving the cracking zone. In the latter case the agglomerates are preferably stripped by steam or the like. In some instances the agglomerates or balls of catalyst may be removed from the bottom of the reaction zone but I prefer to remove them from the regeneration zone. These larger particles may be removed from the system and thrown away or otherwise disposed of but they are preferably ground and the desirable sized particles are removed and returned to the system.

In the drawing the figure represents a diagrammatic showing of one form of apparatus adapted to carry out my invention, but I am not to be restricted thereto as other forms of apparatus may be used.

Referring now to the drawing, the reference character 10 designates a line through which fresh feed is passed by means of pump 12. The fresh feed may be a relatively heavy hydrocarbon oil such as gas oil or other hydrocarbon mixtures may be used. The fresh feed is forced through a heating coil 14 to raise the temperature of the hydrocarbon to the desired point. The heated and vaporized hydrocarbon is then passed through line 16 under a pressure of about 15 lbs./sq. in.

The hydrocarbon vapors are then mixed with powdered catalyst which is introduced by means of line 18 and the catalyst and hydrocarbon mixture is passed through line 20 and introduced into the bottom portion of a vertically arranged reaction zone 22. The catalyst may be any suitable cracking catalyst such as natural or treated clays, synthetic gels containing alumina and silica, or the like, but the invention is especially adapted for use with treated clays. The catalyst which is passed through line 18 is withdrawn from the bottom portion of a vertically arranged container or hopper 24 which contains powdered catalyst. In order to assist removal of the powdered catalyst from the bottom of the container 24 steam may be introduced through line 26 to assist in moving the powdered catalyst through line 18 and injecting it into the hydrocarbon vapors passing through line 16.

The catalyst and hydrocarbon vapors are introduced into the reaction zone 22 at a temperature of about 925° F. and leave the zone 22 at a temperature of about 875° F. and are maintained in the zone 22 for the desired period of time to effect the desired extent of conversion into lower boiling hydrocarbons. The vaporous reaction products and the catalyst in powdered form pass overhead from the reaction chamber 22 through line 30 under a pressure of about 5 lbs./sq. in. and are further treated.

The mixture of powdered catalyst and reaction products passing through line 30 is passed to a cyclone separator 36 in which the separation of solid catalyst particles from vapors and gases takes place. Other separators may be used and if desired the vapors leaving the separator 36 may be passed through additional cyclone separators to separate additional quantities of powdered catalyst therefrom. The powdered catalyst which is removed from the vapors in the cyclone or other separators passes downwardly through line 38 into a separator 42 provided with inclined baffles 44 to permit removal of additional amounts of hydrocarbons from the catalyst particles. If more than one separator is used the vapors and gases from the first separator are passed to the second separator and the catalyst separated in the second separator is returned to separator 42.

The separated vapors leave the top of the cyclone separator 36 and pass through line 46 to a fractionating tower 48 wherein the vapors are fractionated to separate a light fraction containing gasoline constituents from a condensate oil. The vapors after fractionation leave the top of the fractionating tower 48 through line 49 and are passed through the condenser 50 for cooling. The cooled and condensed hydrocarbons are introduced into a separator 51 for separating gases from normally liquid hydrocarbons. The gases are passed overhead through line 52 and the normally liquid hydrocarbons are withdrawn from the bottom of the separator 51 through line 53. A portion of the normally liquid hydrocarbons is preferably passed through line 54 by means of pump 55 and returned to the top of the fractionating tower for refluxing. The condensate oil is withdrawn from the bottom of the fractionating tower 48 and passed through line 56 by means of pump 56' and may be recycled to the line 10 for admixture with the fresh feed for further conversion treatment, or may be treated in any desired manner.

During the conversion of the hydrocarbon vapors in the reaction zone, carbonaceous material or the like is deposited on the catalyst particles and the activity of the catalyst is reduced. In order to reactivate the catalyst particles it is necessary to remove the carbonaceous deposit from the catalyst particles and this is preferably done by oxidation or burning in a separate system. The separated catalyst particles which are introduced into the separator 42 fall downwardly over the baffles 44 and in order to remove residual oil therefrom it is preferable to introduce superheated steam into the lower portion of the separator 42 by means of line 57.

The catalyst particles which are to be regenerated are withdrawn from the bottom of the separator 42 by means of a star feeder or the like 58 which drops the fouled catalyst into a vertically arranged, elongated chamber 59. The fouled catalyst particles collect in the bottom of the container 59 and the level of these particles is shown at 60 in the drawing. The fouled catalyst particles are withdrawn from the bottom of the elongated container 59 by means of a star feeder 62 or the like and the catalyst particles are introduced into a screw feed mechanism 64. This mechanism is provided with a compression screw 66 which is driven by a suitable motor 68 or the like.

It has been found that regeneration of the catalyst under superatmospheric pressure is accomplished more quickly than if the catalyst is regenerated under atmospheric pressure. During the cracking or conversion of the hydrocarbons in the presence of catalyst the pressure is maintained at substantially atmospheric pressure or slightly higher and in order to regenerate the fouled catalyst at a higher pressure it is necessary to increase the pressure before regeneration is started.

Air or other oxidizing gas at a temperature of about 150° F. and under a pressure of about 60 lbs./sq. in. is introduced into dispersion chamber 72 by means of line 73. The screw member 66 forces the fouled catalyst particles into the dispersion chamber 72. The catalyst particles are introduced into chamber 72 at about 875° F. and under about 30 to 35 lbs./sq. in. In order to maintain the pressure within the chamber 72 and to prevent the pressure from backing up into the cracking or conversion system a trap door 76 is provided. This trap door is pivoted at 78 and is provided with a weighted arm 80 for maintaining the door against the catalyst particles which are being forced from the screw mechanism 64 into the dispersion chamber 72.

It is not definitely known how the agglomerates are formed, but it is believed that the relatively high temperature and the mechanical work done on the fouled catalyst particles in screw conveyor 66 cause the agglomeration and formation of larger balls. When the agglomerates or balls are fed through the screw conveyor 66, the fine catalyst particles have a tendency to adhere to the balls and become kneaded into the balls. For example, in one case most of the fresh catalyst particles passed through a 100 mesh screen, whereas after repeated regenerations and reuse a large amount of the catalyst particles did not pass through a 100 mesh screen. The agglomerated particles passing through a 35 mesh screen and retained on an 80 mesh screen were removed as agglomerated catalyst particles. If desired, the particles retained on a 100 mesh screen or smaller particles may be removed as agglomerates, depending on the size of the catalyst particles used in the beginning of the process. This example is merely to illustrate the relative sizes of catalyst particles in one case and my invention is not to be restricted thereto.

The mixture of fouled catalyst and air is then passed through line 84 into a vertically arranged, elongated regeneration zone 86. During this regeneration the air or other oxidizing gas acts to remove the carbonaceous deposits from the catalyst particles by burning the carbonaceous material. It is necessary to prevent overheating of the catalyst particles during regeneration and the temperature in the regeneration zone 86 is controlled by controlling the amount of air or oxidizing gas introduced by line 73.

During regeneration the larger catalyst particles or agglomerates fall downwardly into the bottom of the regeneration zone 86 and are collected at the bottom 92. The zone 86 acts as a classifier to remove the balls or agglomerates. The powdered catalyst and the products of combustion together with other gases pass overhead through line 88 through the coil 94 arranged in a cooler 96 for cooling the catalyst particles. The cooling medium enters through line 98 and leaves the cooler through line 100. Air may be used for cooling, or a salt bath may be used as a cooling medium and the heat recovered elsewhere. A feed stock may be preheated in this cooler and any excess heat may be used for steam generation.

The cooled regenerated catalyst particles at a temperature of about 950° F. and under a pressure of about 20 to 25 lbs/sq. in. are passed through line 102 to a cyclone separator or the like 104 for separating the regenerated catalyst particles from products of combustion and other gases. The gases leave the separator through line 106 and the catalyst particles leave the bottom of the separator through line 108. If desired, additional separators may be used for further treating the gases leaving through line 106 to recover additional amounts of powdered catalyst and the separated catalyst is introduced into the separator 110.

The catalyst particles leaving the separator 104 through line 108 are introduced into the separator 110 provided with baffles 112. The powdered and regenerated catalyst is collected in the bottom of the separator 110. The pressure in the separator 110 is about 20 to 25 lbs./sq. in. and it is necessary to reduce the pressure on this catalyst before introducing it into the hydrocarbon to be converted as the catalytic conversion takes place at substantially atmospheric pressure. The catalyst particles are withdrawn from the bottom of the separator 110 by means of a star feeder or the like 114 and the catalyst particles are introduced into an elongated catalyst container 115, the level of the powered catalyst being shown at 116.

Another star feeder 117 is provided at the bottom of container 115 for reducing the pressure on the catalyst passed to hopper or container 24. The feeder 117 acts like a throttle valve rather than a star feeder. The pressure on the catalyst leaving container or chamber 24 through line 18 is about 15 lbs./sq. in. The oil stock or hydrocarbon fed through inlet line 10 is under about 15 lbs./sq. in. The catalyst particles withdrawn from the bottom of the catalyst container 24 are mixed with the hydrocarbons to be converted as has been previously described.

Line 118 provides means whereby fresh catalyst may be added to the screw mechanism 64 as make-up catalyst. Line 119 provides means whereby fresh catalyst is introduced into the container 110 and at the beginning of the operation only so that catalytic material may be introduced into the catalyst container 24.

The balls or larger catalyst particles withdrawn from the bottom of regeneration zone or chamber 86 are withdrawn from the bottom thereof by means of star feeder or the like 120 whereby the pressure on the catalyst particles is reduced to about 5 lbs./sq. in. If desired a cooling means for the catalyst particles may be provided to cool the catalyst particles before grinding them. These larger particles or agglomerates of catalyst are preferably passed through a grinder 122 of any suitable construction for reducing the size of the catalyst particles. For example, a Reymond mill may be used. The ground catalyst particles are then passed through line 123 to a separator 124 of any suitable construction for separating catalyst particles of the desired size. The catalyst particles which are too small are withdrawn through line 126. The catalyst particles of the desired size are withdrawn from the separator and passed through line 128 in any desired manner to a fresh catalyst make-up hopper associated with line 118 and are recirculated through the screw 66 and the regeneration zone 86 for removing carbonaceous material therefrom. In the regeneration of the larger catalyst particles the outer or exterior portions of the carbonaceous deposits only were removed and after grinding the larger catalyst particles additional carbonaceous material is uncovered and it is desirable to further regenerate the ground particles. If desired, the ground catalyst particles passing through line 128 may be introduced into hopper 110 without further regeneration.

Instead of separating the larger particles by means of gravity and removing only the larger particles as described in classifying zone 86 in the preferred form of my invention, I may withdraw side streams of catalyst and separate the larger catalyst particles or agglomerates therefrom, grind these larger particles and return the catalyst particles of the desired size to the system. A side stream may be withdrawn through line 130 from container 115 to remove larger undesired catalyst particles together with smaller particles and the side stream fed directly to grinder 122 or to an air classification system to separate light material from heavy or large particles. The light material is preferably fed to make-up line 118 and the heavy particles are fed to grinder 122. I prefer not to withdraw side streams, however.

As an alternative, the oil and catalyst mixture may be introduced into the lower portion of the reaction zone 22 and agglomerates or balls of catalyst removed from the bottom of zone 22 and fed to the grinder 122.

In another form of the invention, the cracked products and catalyst particles may be passed through separators, such as cyclones, with the aid of steam or other gas as a stripping agent. The overhead from the first separator is passed to another cyclone separator to separate spent catalyst from cracked products. The spent catalyst is fed to a spent catalyst hopper. The separated catalyst settling in the first separator is passed to another separator by means of steam, and the large particles settling in the last mentioned separator are withdrawn, preferably cooled and ground and returned to the last mentioned separator from whence the light material is passed to the spent catalyst hopper similar to hopper 59.

Instead of grinding the agglomerated catalyst particles and separating desired particles, the agglomerated particles may be otherwise treated, as by chemical means, for example, to recover catalyst particles of the desired size.

While certain temperature and pressure conditions have been included and several ways of practising my invention have been given, it is to be understood that these are merely by way of illustration and various changes and modifications may be made without departing from the spirit of the invention.

I claim:

A method of converting hydrocarbons which comprises mixing powdered clay catalyst with hydrocarbon vapors in a reaction zone maintained under conditions to effect the desired extent of conversion, separating vaporous reaction products from the dry catalyst particles which have become fouled, forcing the fouled catalyst particles through a compression screw into an enlarged regeneration zone maintained under superatmospheric pressure, regenerating the fouled catalyst particles before returning them to said reaction zone by mixing the fouled catalyst particles with an oxidizing gas and passing the mixture upwardly through said regeneration zone, the finer catalyst particles passing overhead with the regeneration gases and the larger hard catalyst particles which have balled-up and which are substantially larger than the catalyst particles used in the beginning of the method falling to the bottom of said regeneration zone and removing the separated larger particles from the bottom of said regeneration zone and from the method.

GUSTAV A. STEIN, Jr.